G. PAGE.
Seed-Planter.
No. 1,617.
Patented May 25, 1840.
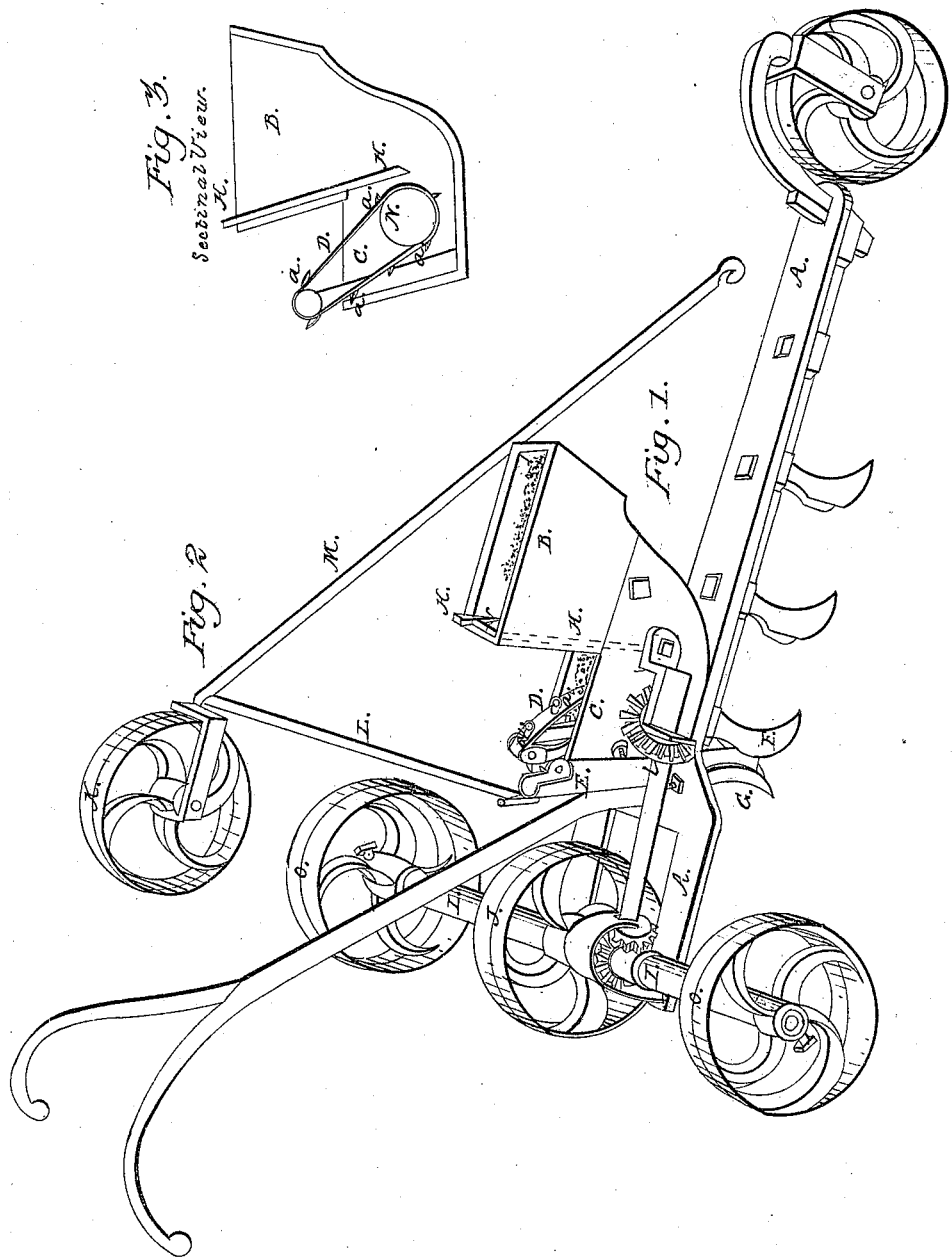

UNITED STATES PATENT OFFICE.

GEO. PAGE, OF BALTIMORE, MARYLAND.

IMPROVEMENT IN SEED-PLANTING MACHINES.

Specification forming part of Letters Patent No. 1,617, dated May 25, 1840.

*To all whom it may concern:*

Be it known that I, GEORGE PAGE, of the city of Baltimore, in the State of Maryland, have invented certain improvements in the machine for planting corn, cotton, and seeds of other kinds; and I do hereby declare that the following is a full and exact description thereof.

Figure 1 in the accompanying drawings is a perspective representation of my machine, the frame, hopper, and most of the other parts of which I make of cast and of wrought iron.

A A is the bed, to which the wheels and other parts are attached. B is a hopper, into which the seeds are to be put, and C a receptacle, from which they are to be taken by the elevator D from the cup upon which they are to be dropped into the tube E, which passes through the bed and extends down nearly to the ground. The lower end of this tube I place so that it shall be within the hollow of the tooth F, and immediately in its rear I place two scrapers, G G, standing so close to each other as to scrape in upon the seed a portion of the earth immediately from the sides of the furrow made by the tooth F, to the exclusion of the lumps and trash on each side of it.

The elevator D is furnished with small cups *a a*, for carrying the seed from the receptacle C and dropping them into the tube E. These cups must be adapted in size and number to the kind of seed to be sown, and for cotton-seed points may be substituted for cups.

The hopper B is furnished with a sliding shutter or gate, H, which may be raised and lowered at pleasure. It forms a partition, which extends entirely across the receptacle C, and by its aid the height to which the seed shall rise in said receptacle may be perfectly regulated. This is a point of great importance in the action of the machine, as without this device the quantity of seed taken up by the cups of the elevator will vary, and the seed will also pass in between the strap of the elevator and the roller N, around which it passes, interfering injuriously with its action.

The elevator is made to revolve by gearing from the main axle I I, as shown at *b b*, or by any analogous arrangement. Fig. 3 is a section through the hopper B and the elevator C.

The sliding shutter H rests against the rear end of the hopper, and descends into the receptacle for the purpose above expressed. For seeds of different kinds this shutter will have to descend to a greater or less depth to preserve the seeds at a level in the receptacle, dependent upon the facility with which they pass over each other.

Three wheels are shown as placed on the axle I I; but I sometimes omit the two outer wheels and use the middle one, J, only. In this case a marking-wheel, K, Fig. 2, may be hooked onto the bed of the instrument, which must be furnished with staples or other devices adapting it to that purpose. The arms L M with the wheel K, will in that case play up and down, unobstructed by inequalities in the ground. The center wheel, *g*, Fig. 1, serves to press the earth on the seed, and when the outer wheels, O O, are used they are so arranged as to be adjustable upon the axle, so as to cause them to mark the distance of the rows from each other at which it is intended to plant the seeds.

From the foregoing description, the manner of using this machine will be obvious, as it is to be drawn and guided in the same way with many others. In windy weather it may be found necessary to protect the seed in the elevators by means of sheets of tin, pieces of thin plank, or other article adapted to that object.

Having thus fully described the manner in which I construct my machine for planting corn and seeds of other kinds, and shown the operation of the respective parts thereof, what I claim therein as constituting my invention, and desire to secure by Letters Patent, is—

1. The manner of combining the hopper and the receptacle with the sliding shutter so as to govern the level of the seed in said receptacle, and thus to regulate the feed, in combination with the elevating-belt D, in the manner set forth.

2. The attaching of a separate marking-wheel, K, in the manner and for the purpose above expressed.

GEORGE PAGE.

Witnesses:
 THOS. P. JONES,
 WM. BOARDMAN.